Feb. 9, 1943.  C. E. EVERETT  2,310,577
SELF PROPELLED COMBINE HARVESTER
Filed April 10, 1942   4 Sheets-Sheet 1

INVENTOR.
CHARLES E. EVERETT
BY A.S.Kroh
ATTORNEY

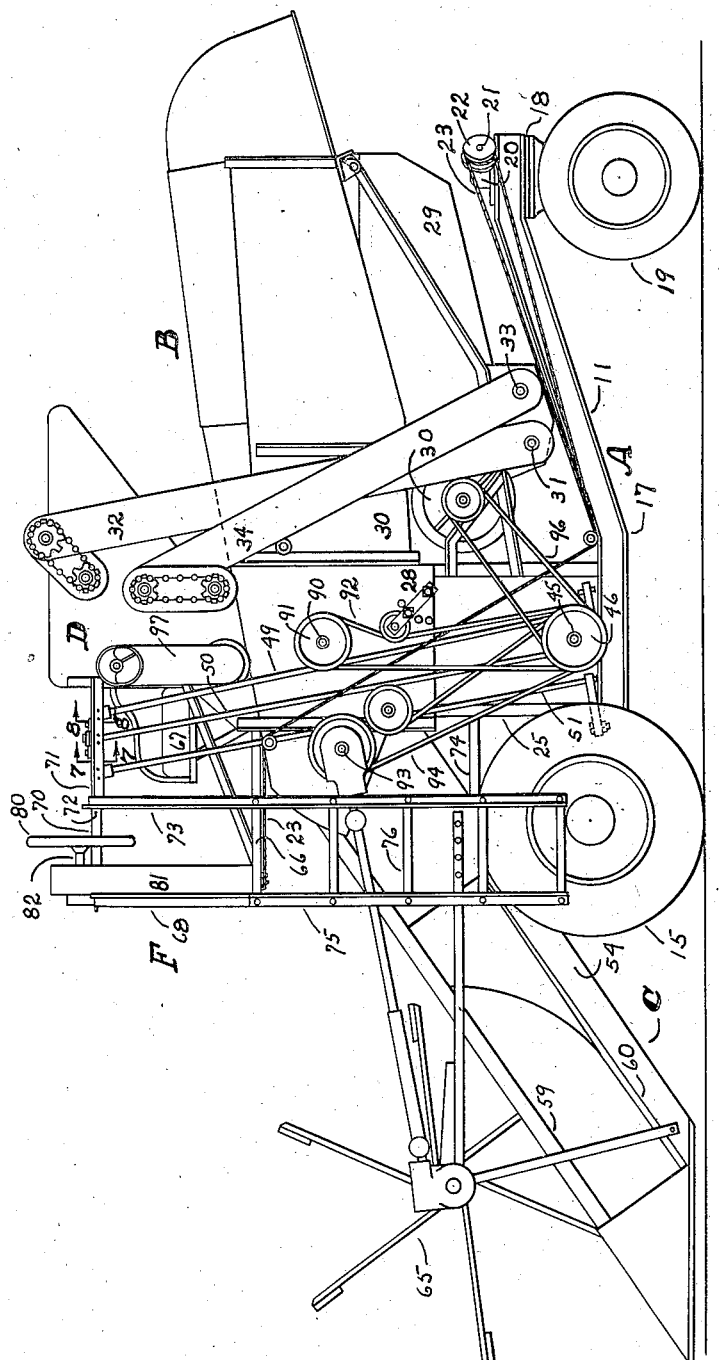

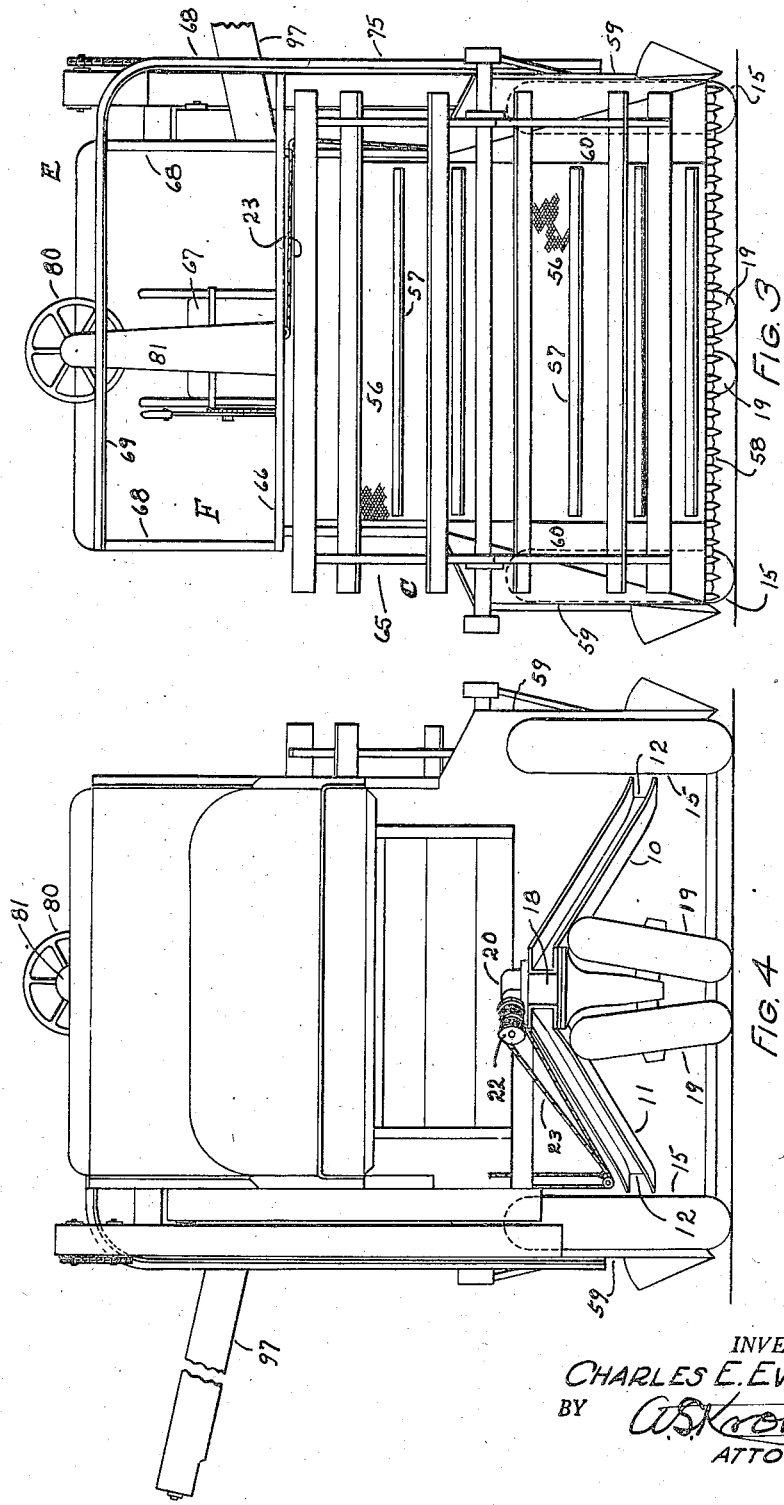

Feb. 9, 1943.  C. E. EVERETT  2,310,577
SELF PROPELLED COMBINE HARVESTER
Filed April 10, 1942  4 Sheets-Sheet 4
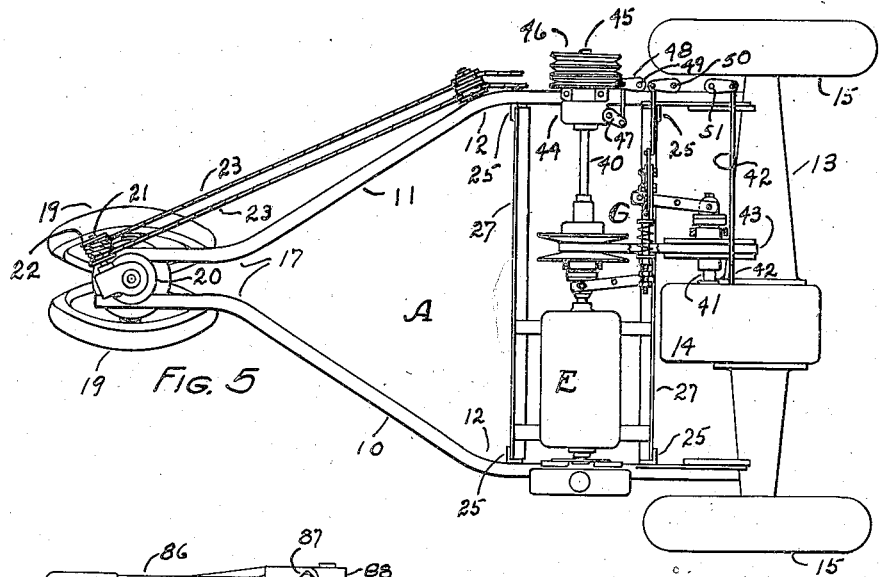
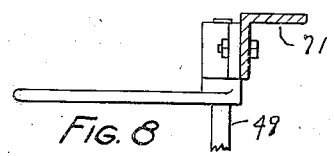
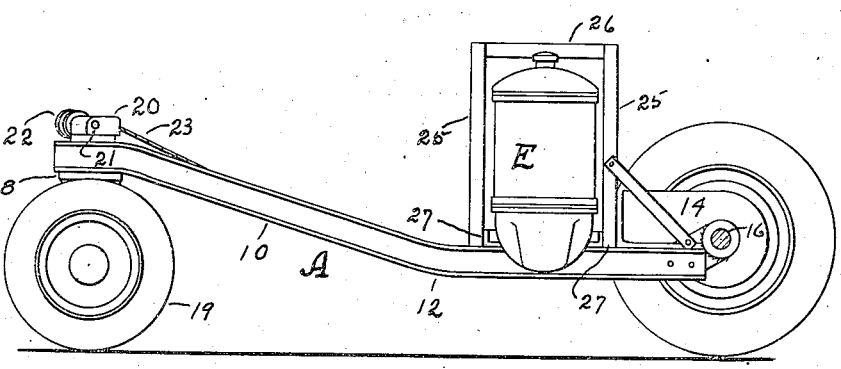
INVENTOR.
CHARLES E. EVERETT
BY
ATTORNEY Patented Feb. 9, 1943

2,310,577

UNITED STATES PATENT OFFICE 2,310,577

SELF-PROPELLED COMBINE-HARVESTER

Charles E. Everett, Racine, Wis., assignor to The Massey-Harris Company, Racine, Wis., a corporation of Maryland Application April 10, 1942, Serial No. 438,494

3 Claims. (Cl. 56—21)

The present invention relates to a self-propelled combine harvester wherein the device is powered, guided and controlled similar to an automobile or tractor and wherein the driving wheels are in front and the steering wheels are in the rear.

An important feature of my invention is that the cutter bar is longer than the overall width of the driving wheels and that the threshing unit and grain elevator are somewhat narrower than the space between the driving wheels and wherein overhanging gathering means are provided for moving the extra width of grain cut on the elevator.

Another important feature of my invention is that it operates on what is called the straight-through principle as shown in my copending application for Design Patent Serial No. 104,005, filed November 3, 1941.

An object of my invention is to provide a separate chassis or frame upon which the entire harvesting unit may be detachably mounted and wherein the guiding wheels are considerably closer together than the driving wheels and are positioned under the rear end of the threshing unit.

A further object of my invention is to provide an operator's platform and position it directly over the rear end of the elevation platform and in front of a grain bin or bagging platform and having an operator's seat and other appurtenances by which the operator may guide and control the movement of the device over the ground and control the operation of the cutting, elevating and threshing devices.

A still further object of the present invention is to provide a supplemental frame on which the forward end of the separator is mounted and whereby the motor may be mounted within this supplemental frame and in rear of the driving wheel axle housing.

Another object of my invention is to provide a driving wheel axle housing similar to trucks or automobiles and having an operating connection from the engine to the differential of the axle.

A still further object of my invention is to provide a device of the class whereby the ground wheels travel within the swath cut and whereby the operator will be in the most advantageous position to efficiently control the device.

An object of the present invention is to provide a chassis and power unit from which the cutting, elevating and threshing devices may be detached and other devices mounted on the frame, for example, a corn harvester.

To these and other useful ends, my invention consists of parts, combinations of parts, or their equivalents and mode of operation, as hereinafter set forth and claimed and shown in the accompanying drawings in which:

Fig. 2 is an elevational view of the left side of my complete harvester.

Fig. 3 is a front elevational view of the device shown in Figures 1 and 2.

Fig. 4 is a rear elevational view of the device shown in Figures 1 and 2.

Fig. 5 is a top view of the chassis after the harvesting device has been removed.

Fig. 6 is a side elevational view of the chassis shown in Figure 5.

Fig. 7 is a sectional view taken on line 7—7 of Figure 2.

Fig. 8 is a fractional sectional view taken on line 8—8 of Figure 2.

Figure 1:
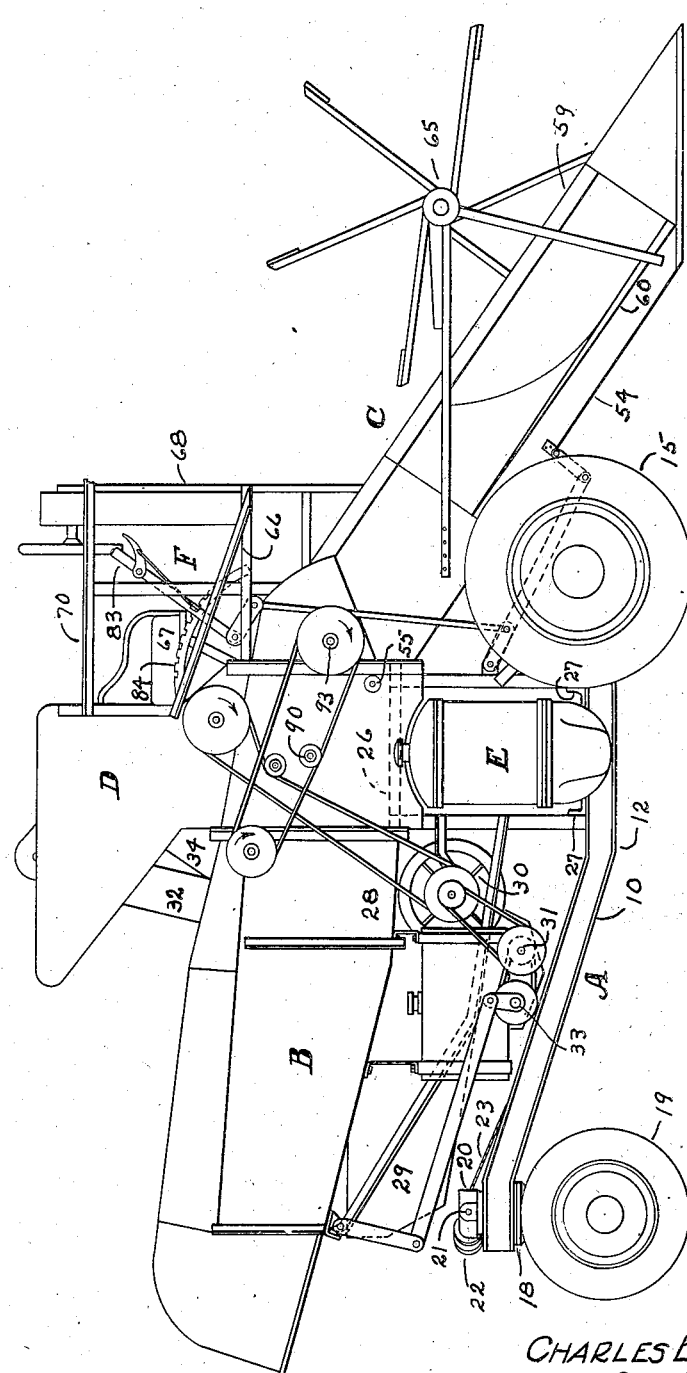
Fig. 1 is a side elevational view of the right side of one design of my self-propelled harvester.

As thus illustrated, the chassis, including the power unit is designated in its entirety by reference character A. The threshing unit is designated in its entirety by reference character B. The cutting, gathering and elevating means of the device are designated in their entirety by reference character C. Reference character D designates in its entirety the grain bin. Character E designates the engine in its entirety and F designates the operator's platform in its entirety including the operator's seat, the steering wheel and control levers.

Member A comprises right and left hand frame bars 10 and 11, the bars being spaced at their front ends as shown in Figure 5 and being bent inwardly and upwardly as at 12—12 (see Figures 5 and 6). On the front ends of these side bars I mount an axle housing 13 having a transmission and differential housing 14 and carrying wheels 15—15. Within this housing I provide axle shafts 16 which extend in opposite direction and protrude through the housing and upon the ends of which wheels 15 are mounted. The inner ends of shafts 16 have preferably an automobile style differential (not shown) from which power is supplied for the driving wheels.

The rear ends of members 10 and 11 are bent as at 17—17 (see Figure 5) so the ends extend rearwardly in parallel relation and being secured to a bracket 18. I provide preferably two guiding wheels 19 which are pivotally mounted on a bracket having a trunnion which extends through member 18, the ends protruding and extending into housing 20 and having mounted thereon a worm gear (not shown).

I rotatably mount a shaft 21 in member 20 on which is mounted a worm pinion which operatively engages the worm gear. The protruding end of shaft 21 is adapted to carry an elongated sheave 22 around which cable 23 is wound, both ends extending forwardly as illustrated in Figure 5 so when these cable members are moved, shaft 21 will be turned and as a result turn wheels 19 for guiding the device. Castered guiding wheels of the class are too well known to require further description.

I provide a supplemental frame comprising preferably corner posts 25 which are secured to side members 10 and 11 and having anchor bars 26 at their upper ends and transverse connecting members 27 at their lower ends, thus forming a skeleton-like frame which is considerably longer than its width and having a height adapted to receive the bottom edges of panels 28 of member B (see Figure 1). Member B includes a grain cleaner 29 and a blower fan 30, the cleaning device and blower fan inclosure extending downwardly in rear of frame bars 25 terminating somewhat above the rear ends of frame members 10 and 11 (see Figures 1 and 2).

Member B in its entirety is very similar to other separators or threshers and has all the necessary devices for separating the grain from the straw and separating the chaff from the grain. After the separating operations, the clean grain is caused to travel in a worm conveyor, the shaft of which is designated by numeral 31 (see Figure 1) having means whereby the clean grain is conveyed to an elevator 32 at the upper end of which is means for conducting grain into the grain bin D.

The tailings collected by member 29 are conducted to a worm conveyor having a shaft 33, the conveyor conducting the tailings to an elevator 34 from whence the tailings are returned into the threshing device in a manner which is too well known to require further description.

Member D may be fastened in any convenient manner to the forward top surface of member B as illustrated in the figures. Engine E is mounted within the supplemental frame as clearly illustrated in Figures 1, 5 and 6 and having a protruding crank shaft or an extension 40 to the crank shaft. A shaft 41 is operatively connected to the differential of housing 13 preferably by means of a series of gears which may be shifted by means of the gear shifting shaft 42 so as to change the speed ratio.

I mount on shafts 40 and 41 preferably a V-belt transmission and clutch which in their entirety are designated by reference character G. This transmission and clutch is illustrated and described in a copending application for patent Serial No. 419,876 filed January 5, 1942, Charles V. Everett. It will be seen that power from the engine may be conveyed to shaft 41 by means of belt 43 and at different speed ratios and that further speed ratios may be secured by shifting the gears by means of shaft 42.

Shaft 40 extends into a gear box 44 having a clutch by means of which power may be transmitted to a protruding shaft 45 having mounted thereon a multiple V-belt sheave 46, the object of which will hereinafter appear. The shifting of the clutch in box 44 is accomplished by means of a lever 47 which is in turn connected to a lever 48 mounted on the lower end of a shaft 49.

Transmission G is operatively connected to a vertically extending shaft 50 and shaft 42 is operatively connected to a vertically extending shaft 51. Shafts 49, 50 and 51 extend to a point within easy reach of the operator and in a manner which will hereinafter appear. The object of these connections clearly is to place the transmission, clutch and gear shifting shafts within reach of the operator as will hereinafter appear.

Member C comprises an elevator platform of well known design having side bars 54 which are preferably hinged to the front end of member B as at 55. An endless canvas apron 56 with suitable slats 57 is provided. I mount on the forward end of the frame of the elevator a cutter bar 58 which is considerably longer than the width of the elevator so the ends of the cutter bar overhang the elevator so as to cut a swath wider than the overall width of the ground wheels 15, the ends overhanging the elevator substantially as shown in Figure 3.

Gathering means comprising side plates 59 and ledges 60 are provided (see Figure 3) for moving the extra width of grain cut inwardly and on the elevator apron 56 as clearly illustrated in Reissue Patent 21,421, issued April 9, 1940, John S. Troyer.

It will be seen that the swath cut by cutter bar 58 is greater than the overall width of wheels 15 so a swath can be cut through a field without running over grain which is uncut and the device may be directed by means of the rear wheels 19. I provide the usual grain reel 65 which is driven as will hereinafter appear.

Platform F comprises a floor 66 which is suitably secured to members B and D as illustrated in the various figures having an operator's seat 67 which is preferably secured to members D and F in the position shown in the various figures.

Corner posts 68—68 are provided having a front railing 69, a right side railing 70 and a left side railing 71 which terminates as at 72. Railing 71 is secured to one of the bars 73 of a ladder having a front bar 75 which is preferably an extension of member 68 with rungs 76 forming a ladder by means of which the operator may climb to the platform. The rear bar of the ladder is preferably anchored to the adjacent frame post 25 as at 74. Platform 66 extends to the left far enough so it is slightly outside the vertical plane of wheel 16, thus to provide convenient means for the operator to climb to the platform.

I provide a steering wheel 80 which is mounted on a pedestal 81 by means of a shaft 82, the forward end of the shaft having a sheave (not shown) which is similar to sheave 22 and around which cable 23 is wound so that by turning wheel 80, carrying and guiding wheels 19 may be pointed in either direction for steering the device, all of which will be understood without further description.

I provide any convenient means for raising and lowering the cutter bar preferably by means of a lever 83 having a sector 84 and being operatively connected to platform C (see Figure 1).

Shaft 50 is provided with a bearing 71 secured to bar 70 (see Figures 2 and 7). A sector 85 is provided and a lever 86 is horizontally hinged to shaft 50 as at 87 by means of hub 88. Lever 86 is provided with a downwardly extending plate 89 adapted to engage one of the notches in sector 85; thus by moving lever 86 forwardly or rearwardly, the speed ratio between shafts 40 and 41 may be changed.

Shaft 49 is rotatably mounted on railing 71 similar to shaft 50 and is provided with an inwardly extending lever (see Figure 8) whereby the clutch in housing 44 may be engaged and disengaged. Shaft 51 is similarly mounted on member 71 and provided with an inwardly extending lever (see Figure 8) so the gears in housing 14 may be shifted from the driver's seat. The engine, as usual, is provided with a power control valve having rods which extend to a foot pedal on platform 66, thus the operator may control the speed of the engine, the height of the cutter bar, and the ratio between the engine and differential.

Unit B is provided with a threshing cylinder which is mounted on a shaft 90 having sheave pulley 91 (see Fig. 1) and receiving power from sheave 46 through belt 92.

Another of the sheaves on shaft 45 is operatively connected to a beater shaft 93 by means of a V-belt 94. An operating connection is formed between shaft 93 and the shaft of reel 65 as illustrated in Figure 2.

Fan 30 is operatively connected to a third sheave pulley on shaft 45 by means of a belt 96. Conveyor shafts 31 and 33 receive power from the right end of the fan shaft. A suitable crank is provided on the end of shaft 33 with connections to member 29 for oscillating this member as is the custom in grain separators of the kind.

Means are provided for directing the grain from the grain bin to a wagon through a spout 97 and means are provided for driving the worm of this spout.

It will be seen that the operator's position is directly over the rear end of the platform where he has an unobstructed view of the operation of the cutter bar and elevator and the controlling levers are all with easy reach so that the device may be operated successfully.

It will be understood that certain details have no part of the present invention, for example, the threshing unit may be variously designed insofar as the operating parts are concerned. The grain cleaner and conveying means may also be differently designed. The principles which I claim to be novel are generally outlined in the preamble of this specification and the means for bringing about the operation of the device as recited in this preamble clearly may be differently designed; therefore I do not wish to be limited to any particular detail. For example, different transmissions may be supplied to the device and other changes made without departing from the spirit and scope of the present invention as recited in the appended claims.

Having thus shown and described my invention, I claim:

1. A self-propelled harvester of the class described, comprising a chassis frame having an axle housing mounted on the forward end thereof, said axle housing having axles and carrying and driving wheels, guiding and carrying means mounted on the rear end of said chassis, an upwardly extending transversely positioned supplemental frame mounted on said chassis frame a short distance in rear of said axle housing, a longitudinally positioned threshing unit mounted at its forward end on said supplemental frame, cutting and elevating devices mounted at their rear ends to the forward end of said threshing unit, an engine mounted within said supplemental frame and having operating connections to said thresher, cutting and elevating devices and the axles of said housing, said separator and elevating devices having a width somewhat less than the space between said driving wheels, said cutting device having a length somewhat greater than the overall width of said driving wheels, gathering means secured to the sides of said elevator and the overhanging ends of said cutting device and overhanging said driving wheels and adapted to move the extra width of grain cut toward and on the elevator.

2. A self-propelled combine harvester of the class described, comprising a chassis frame having an axle housing mounted on the forward end thereof, said axle housing having axles and carrying and driving wheels, guiding and carrying means mounted on the rear end of said chassis, an upwardly extending transversely positioned supplemental frame mounted on said chassis frame a short distance in rear of said axle housing, a longitudinally positioned harvester unit mounted on said supplemental frame intermediate its ends, an engine mounted within said supplemental frame having operating connections to said harvester and to said carrying wheels, an operator's platform in an elevated position having an operator's seat positioned above said harvester unit and means whereby the operator may control the movement of the device over the ground from the seat and the operation of said harvester from the seat.

3. A self-propelled harvester of the class described, comprising a chassis frame having an axle housing mounted on the forward end thereof, said axle housing having axles, a differential and carrying and driving wheels, guiding and carrying means mounted on the rear end of said chassis, an upwardly extending elongated transversely positioned supplemental frame mounted on said chassis frame a short distance in rear of said axle housing, a longitudinally positioned threshing unit removably mounted at its forward end on said supplemental frame, an elevator hingedly mounted at its rear end to the front end of said threshing unit and having a cutter bar on its front end, an engine mounted within said supplemental frame and having operating connections to said threshing unit, elevator, cutter bar and differential, said separator and elevator having a width somewhat less than the space between said driving wheels, said cutter bar having a length somewhat greater than the overall width of said driving wheels, gathering means secured to the sides of said elevator and the overhanging ends of said cutter bar and adapted to move the extra width of grain cut toward and on the elevator, a grain bin positioned on the forward end of said separator, an operator's platform positioned over the rear end of said elevating device, a driver's seat positioned above said platform and means whereby the operator, from the seat, may control the movement and operation of the harvester over the ground.

CHARLES E. EVERETT.